United States Patent [19]

Dey et al.

[11] 4,115,629

[45] Sep. 19, 1978

[54] HERMETIC VENT STRUCTURE

[75] Inventors: Arabinda N. Dey, Needham; James H. Him, Burlington, both of Mass.

[73] Assignee: P.R. Mallory & Co. Inc., Indianapolis, Ind.

[21] Appl. No.: 865,149

[22] Filed: Dec. 28, 1977

Related U.S. Application Data

[63] Continuation-in-part of Ser. No. 700,421, Jun. 28, 1976, abandoned.

[51] Int. Cl.² .............................................. H01M 2/12
[52] U.S. Cl. .................................... 429/56; 429/174; 174/50.61; 361/433

[58] Field of Search ......................... 429/56, 174, 175; 317/230; 174/50.61; 361/433

[56] References Cited

U.S. PATENT DOCUMENTS

| | | | |
|---|---|---|---|
| 3,005,865 | 10/1961 | Jonsson | 429/184 |
| 3,064,065 | 11/1962 | Belove | 429/56 |
| 3,646,405 | 2/1972 | Wallis et al. | 174/50.61 |

Primary Examiner—Donald L. Walton
Attorney, Agent, or Firm—Ronald S. Cornell; Israel Nissenbaum; Charles W. Hoffmann

[57] ABSTRACT

An hermetic vent utilizing a metal-to-glass-to-metal seal between a metallic disc and a metallic container.

14 Claims, 5 Drawing Figures

HERMETIC VENT STRUCTURE

This is a continuation-in-part of application Ser. No. 700,421, filed June 28, 1976, now abandoned.

This invention relates to electrical devices having a vent and, more particularly, to electrochemical cells having an hermetic vent capable of venting at low pressures which vent is resistant to external shock and abuse.

Vents in general have been constructed as one-time safety devices in which built-up, pressurized material is permitted egress from an enclosed space. Some vents, such as gas permeable-liquid impermeable membranes or pressure sensitive movable members which provide temporary opening under elevated pressures, are meant to be repeatedly operable. However, these vents lack the hermeticity required in cells utilizing reactive materials such as lithium, high vapor pressure organic solvents such as tetrahydrofuran and inorganic electrolyte/solvents such as thionyl chloride ($SOCl_2$) and sulfur dioxide ($SO_2$).

Among those vents which are designed for use as a one-time safety device, probably the most common type consists of a plug of a material sensitive to high pressure and/or concomitant high temperature wherein the plug is placed in a preformed aperture and is expelled under the high pressure condition, or melted under the high temperature condition, or both. This type of vent lacks the aforementioned hermeticity since, in order to permit expulsion, it usually does not involve any bonding between the plug and the aperture walls. Additionally, this type of vent, while useful for venting gases at elevated pressures above 400 p.s.i., at which point the venting characteristics can be more readily controlled, is erratic at lower venting pressures where its behavior becomes unpredictable.

Truly hermetic vents have included containers which are unitary in structure with a portion of a wall of the container deliberately weakened by thinning it so that an opening is formed in the wall of the container at elevated pressures to allow for pressure relief. These vents, while hermetic, suffer from several drawbacks. Since the wall is thinner at one point, that area becomes susceptible to electrolyte attack and ensuing corrosion. Additionally, the container is structurally weakened and is therefore prone to breakage at the weakened point upon external shock. These factors become especially important when the device must be capable of venting at low pressures since it would be necessary to make the metal exceedingly thin at the venting point. Additionally, since such vents are dependent upon inelastic stretching of material, the venting characteristics cannot be accurately controlled due to various factors including curvature, thickness and material condition. For example, the pressure at which the vent if formed is determined not by the stable elastic properties of the material, but by its ultimate plastic deformation behavior which is dependent upon composition and the mechanical and thermal history of the material which is to open into the vent.

It is therefore an object of the present invention to provide a truly hermetic low pressure vent which can be reliably vented at predetermined low pressures and which is inert to internal reactive materials as well as to external shock forces or abuse, and which vent is easily and simply constructed.

In U.S. Pat. No. 3,646,405, issued on Feb. 29, 1972 to Wallis et al., and having a common assignee with the instant application, there is disclosed an hermetic seal for articles having a container with an electrical component therein. The device disclosed in said patent includes a metal terminal disc sealed to a wall of the container of the device by means of a glass frame. Attached to said disc is a metal electrode 13 which is fixedly attached to the disc as well as to the electrical element in the container. Among the preferred embodiments, of electrical devices disclosed in said patent are capacitors and semiconductors which may, as shown in FIG. 6 thereof, be secured in place by potting material 56 or the like. Generally, the devices disclosed in said patent are adapted to operate at ambient pressure.

It has now been found that technology similar to that which was used to form hermetically sealed terminals, as suggested in said U.S. Pat. No. 3,646,405, can, with modifications, be made useful for the entirely different result of forming a low pressure vent for an electrical device (such as certain electrochemical cells) that are adapted to operate under increased internal pressure, but in which that pressure must be maintained below a critical pressure for safety or other reasons. The disclosure of said U.S. Pat. No. 3,646,405 is incorporated herein by reference thereto.

In accordance with the present invention, there is provided a cell closure which includes a flexible metallic closure member, said member having an aperture of predetermined area in portion thereof, a metallic disc of a size larger than said aperture symmetrically positioned over said aperture, and a glass or ceramic layer hermetically bonded to said closure member and to said disc. The wall structure formed thereby is adapted to rupture upon increased internal pressure. Rupture is apparently caused when a rise in the internal pressure causes the closure to flex outwardly, as to a dome shape, and the rupture occurs when in addition to the outward pressure directed against said disc through said aperture, the effect of such flexure becomes great enough to produce a shear force sufficiently large to fracture either the glass seat itself or the bond between the glass seal and either the metal closure member or the metal disc. Because of the direction of movement there are little frictional forces between glass and metal prior to rupture. This enables low pressure venting resulting from a simple break of the glass or glass-metal bond.

In order to permit outward movement of said wall, it is necessary that the vent structure not be encumbered to any significant extent in its outward movement under pressure. Accordingly, it is undesirable to include any inextensible means connecting the metallic disc with any element in the interior of the container such as, for example, the metal electrode 13 shown in said U.S. Pat. No. 3,646,405. In large cells such as D size cells it is highly preferable to use the vent means by itself and not as a terminal.

In order to maintain the value of the vent means while using it as a terminal, internal connections must be extensible such that outward motion during venting is unimpeded. Unimpeded movement is necessary in order to provide controllable low pressure venting of below about 400 p.s.i.g. However, such extensible connections having free movement may lead to internal shorting during venting with adverse effects in large cells having reactive components unless additional steps of insulating the connectors are done. Cells held into position by external pressure on such terminals may also have venting detrimentally affected thereby. Cells having a button configuration however generally do not have such adverse consequences and the venting means may also readily serve as the terminal for such cells.

Various objects of the invention and the nature thereof will be readily apparent to one skilled in the art from the following description thereof considered in conjunction with the drawing wherein.

Generally, the present invention relates to a low pressure vent in which a metallic disc is sealed by a glass or ceramic material to a metallic container having a preformed aperture therein, said disc covering said aperture to thereby hermetically seal said container. The glass which is used has a coefficient of expansion which is substantially the same as the metallic disc and container.

Figure 1:
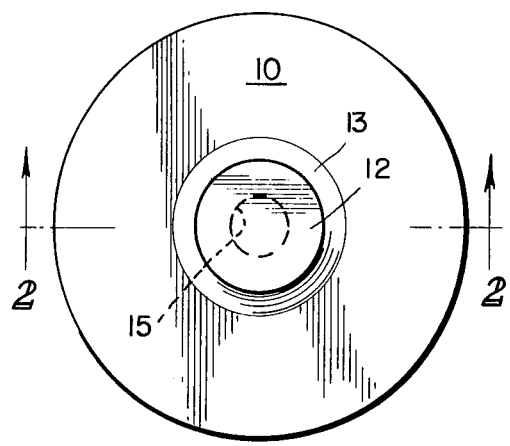
FIG. 1 is a top view of the low pressure vent of the present invention.
Figure 2:
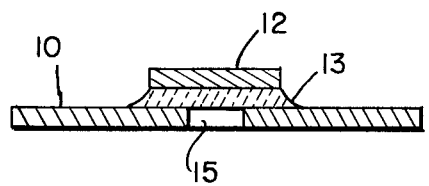
FIG. 2 is a cross-sectional view taken along line 2—2 of FIG. 1.

Referring now to FIGS. 1 and 2 there is shown a flexible container top 10 with an aperture 15 preformed therein. A metallic disc 12 is of greater diameter than aperture 15 and overlaps aperture 15 by a predetermined amount. Glass seal 13 interconnects disc 12 with container end 10 by conventional glass-to-metal sealing techniques to form a vent. Because of the overlap between disc 12 and container top 10 external forces do not deleteriously affect the vent since any external impact is expended against the buttressing, overlapping portion of top 10 against which disc 12 is supported and attached. The glass seal 13 has the ability to provide an hermetic closure which is resistant to corrosive materials within the container, yet is capable of rupturing at low pressures caused by internal container pressure and the shear resulting from the internal container pressure. However, the vent is formed to have sufficient strength to withstand normal operating pressures.

Figure 3:
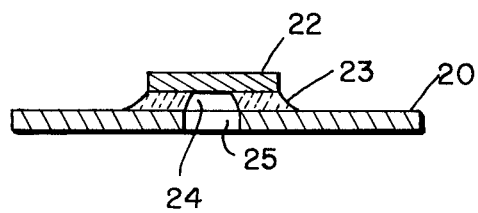
FIG. 3 is a cross-sectional view similar to FIG. 2 but showing a different embodiment of the invention.

FIG. 3 relates to an alternate embodiment of the invention wherein there is provided a flexible container 20 having an aperture 25 therein. Metal disc 22 is sealed to a top 20 by a glass ring 23, which ring 23 has an aperture 24 therein. In this embodiment the aperture in the glass sealing member permits the internal pressure to act directly upon disc 22 as contrasted with the embodiment shown in FIG. 2 wherein the internal pressure acts directly upon glass layer 13, and only indirectly upon metallic disc 12.

Although any desired metals can be used for the metallic elements of the low pressure vent of the invention, perhaps the most common matched expansion hermetic seals employ nickel-iron alloys such as the alloy sold under the trade name KOVAR which is approximately 54 percent iron, 28 percent nickel and 18 percent cobalt. Such nickel-iron alloys generally possess coefficients of thermal expansion substantially the same as that of borosilicate glasses, as for example, a glass sold by the Corning Glass Company designated 7,052. One of the steps generally performed in making matched hermetic seals using KOVAR metal members is that of forming an oxide film on the KOVAR metal members prior to fusing them to the Corning 7,052 glass by melting the glass. The thickness of the oxide film on the KOVAR metal members appears to be important, for too little or too much oxide film may result in a seal which may not be hermetic or in a seal which may have other undesirable characteristics. The oxide film of the surface of the KOVAR metal members is dissolved or interlocked with constituents of the molten glass such as boric oxide and silica. The oxide film on the KOVAR metal members appears to be the means by which a fused joint between the KOVAR members and the glass member of the matched hermetic seal is provided. Various metals and glasses that may be used for this invention are disclosed in the Wallis et al. U.S. Pat. No. 3,646,405 the disclosure of which is incorporated herein. Since the thermal coefficient of expansion of KOVAR is about $50 \times 10^{-7}/°$ C., suitable glasses which may have thermal coefficient of expansion similar to that of KOVAR are the borosilicate glasses which usually contain up to about 80 percent silica ($SiO_2$), up to about 14 percent boron oxide ($B_2O_3$), up to about 4 percent sode $Na_2O$), the remainder essentially alumina ($Al_2O_3$) Typical borosilicate glasses which may be used as the glass member of the seal may be 7,047, 7,050, 7,052, 7,055 and 7,056 sold by the Corning Glass Company, having thermal coneefficients of expansion of about $48 \times 10^{-7}/°$ C., about $46 \times 10^{-7}/°$ C., about $46 \times 10^{-7}/°$ C., about $51.5 \times 10^{-7}/°$ C., and about $51 \times 10^{-8}/°$ C. respectively.

It is important that the metal forming container top 10, regardless of its composition, be sufficiently thin to permit it to bow outwardly under internal pressure. As the top 10 flexes outwardly a shear force appears to be imparted to the glass seal 13 and to the bond between said seal and the metal surfaces to which it is attached. At the same point this force becomes large enough to rupture the seal. The rupture force is aided by pressure against the inside of seal 13 (or disc 22), and this pressure will vary with changes in the internal pressure and with the size of the aperture 15 (or 25). The force against disc 12 is, of course, directly proportional to the area of said aperture 15. On the other hand, the force resisting rupture is directly related to the extent of overlap between the top 10 and the disc 12.

Although various forces affect the rupture point, it has been found that, given specific materials of specific sizes and thicknesses, the results are readily reproducible. Accordingly, a device such as an electrochemical cell can be made to consistently vent at specified pressures within narrow limits. The vents of the present invention are especially useful for venting electrochemical cells (especially Li/SOCl$_2$ cells) at pressures up to 200 p.s.i.g, and in a preferred embodiment at pressures within the range of 80–120 p.s.i.g.

Figure 4:
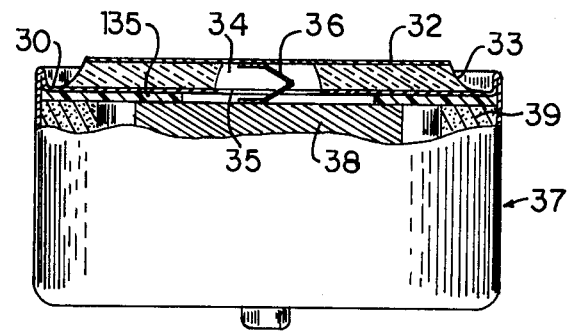
FIG. 4 is a button cell partly in section embodying a modification of the vent of FIG. 3.

In FIG. 4 a button type electrochemical cell with the vent of the present invention utilizes a vent member as a terminal. The vent comprises metallic disc 32, glass ring 33, with circular aperture 34, sealed thereto. Glass ring 33 is sealed on its second side to cell end 30 around the periphery of aperture 35. Elbow shaped terminal connector 36 extends through apertures 35 and 34 for electrical connection between electrode element 38 and disc 32. Terminal connector 36 is a thin tab having a high degree of fliexibility whereby during venting it will not impede outward movement and venting operation as above described.

Figure 5:
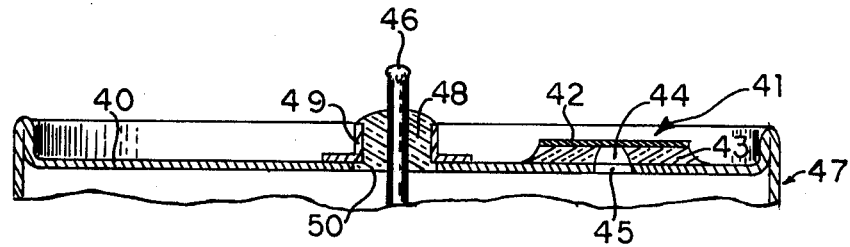
FIG. 5 is a sectioned view of the top of a D size cell embodying a modification of the vent of FIG. 3.

In FIG. 5 cell top 40 of cell 47 has two circular apertures 50 and 45 therein. Terminal post 46 extends through aperture 50 and is insulatingly separated from cell top 40 by glass member 48. Cylindrical metal member 49 sealed to glass member 48 serves to support terminal 46 on cell top 40 by having its flange welded to cell top 40. Vent 41 comprises metal disc 42 bonded to glass ring 43 with aperture 44 which is in turn bonded to cell top 40 around the periphery of aperture 45. Internal cell pressure acts on disc 42 directly through apertures 45 and 44. Post 46 and cell top 40 and the remainder of the cell container serves as cell terminals. Metal disc 42 does not however serve as a terminal for cell 47 because of its electrical isolation from electrode materials.

Prior art glass to metal hermetic seals may be categorized into two general types, that is, matched seals and compression seals. The latter are based on the elasticity of the glass member and upon stresses formed in the glass member due to differences in the coefficients of thermal expansion of the metal member and the glass member. In matched hermetic seals, the coefficient of thermal expansion of the glass or the ceramic material corresponds closely to that of the metal members. In addition, the hermetic seal depends on adherence between the glass or the ceramic member and the metallic member to provide a hermetic seal therebetween. The maximum tolerable difference between the coefficient of expansion of each of the members of the seal is usually about $20 \times 10^{-7}/°C$.

Matched hermetic seals employ glasses of special composition so that the coefficient of thermal expansion of the glass member corresponds closely to that of the metal member to which the glass member is to be fused. Whatever the metal member or the glass member employed in the matched hermetic seal, the joint between the members of the hermetic seal depends on adherence caused by fusion between the glass member and the metal member.

Since the vents of the present invention use hermetic seals of the matched expansion type it is surprising that the vents operate because of the shear effects that are caused by differences in expansion between top 10 and disc 12 which results in the rupture of the glass seal in the manner described above.

The following examples are given to enable those skilled in the art to more clearly understand the concepts of the present invention. The examples should not be considered as a limitation upon the scope of the present invention, but merely as being illustrative thereof.

EXAMPLE 1

To three D size cylindrical electrochemical cell containers (1.28 inch O.D. and 2.4 inch height) each having a top formed of KOVAR metal with a 5/32 inch diameter aperture therein there is fitted a metallic disc of the same metal, said disc having an outside diameter of 0.375 inch. A matched expansion, metal-to-glass-to-metal seal is formed between the disc and the covered periphery of the can aperture. The glass used is a preformed ring made out of Corning 7,052 glass and having a thickness of 0.015 inch. In order to bond the glass to the metal members the metal disc and can top are first oxidized, then placed in a furnace with the glass ring between the disc and the aperture periphery. The glass is melted and annealed at a temperature of 1150° C. for 25 minutes to form the hermetic bonds.

In order to test the vent the cans are pressurized with the pressure at which the vent opens being monitored. All three cans vent at a pressure of $105 \pm 5$ p.s.i.g.

EXAMPLE 2

D size cells are constructed with a lithium anode and a carbonaceous cathode by winding in a conventional manner 20 inch by 1.75 inch electrodes having a glass separator therebetween and placing the resulting roll of material in a nickel can. The can is filled with 1 (M) $LiAlCl_4$ thionyl chloride electrolyte and covered with a KOVAR top fitted with the vent described in Example 1. The cells are deliberately shorted externally.

Although cells utilizing thionyl chloride, when vented at venting pressures above about 200 p.s.i.g., sometimes have a tendency to explode despite the venting, the cells of this example vent without explosion. In cells of this and similar types it is clearly desirable that they be vented at pressures well below conventional electrochemical cell container venting pressures of about 400 p.s.i.g. Therefore, the vents of the present invention are particularly useful in venting these types of cells since they can be formed to reliably vent at predetermined pressures low enough to avoid the problems referred to above. Additionally, the vent of the present invention immediately provides an opening which is sufficiently large to safely vent the thionyl chloride before additional internal pressure can be built up.

What is claimed is:

1. An electrical device in a closed metallic container having a low pressure vent therein, said vent comprising an aperture in a flexible metallic part of said metallic container said aperture having a predetermined area, a metallic member covering said aperture externally, said member being of a size greater than the size of said aperture and overlapping the periphery of said aperture, said member and said metallic part being separated by and hermetically attached to each other by a layer of glass bonded thereto, wherein movement of said member in relation to said metallic part is unimpeded by further attachment of said member to said container or to said electrical device, said glass and the metals of said flexible part and said member all having substantially equal coefficients of expansion.

2. The electrical device of claim 1 wherein said electrical device is subject to undesirable pressure increases.

3. The electrical device of claim 1 wherein said metallic container is a cylinder and said vent is on an end wall thereof.

4. The electrical device of claim 3 wherein said metallic member is a disc and said aperture is circular, with said aperture, and said disc being concentric.

5. The electrical device of claim 1 wherein said glass layer is ring shaped, the inner radius of said ring being approximately equal to the radius of said aperture.

6. The electrical device of claim 1 wherein said metallic member and said flexible part are composed of a nickel-iron alloy and said glass layer is a borosilicate glass.

7. The electrical device of claim 1 wherein said flexible part is flat and said metallic member is of substantially uniform thickness throughout.

8. The electrical device of claim 1 wherein said coefficients of expansion do not differ from each other by an amount greater than $20 \times 10^{-7}/°C$.

9. The electrical device of claim 1 wherein said electrical device is an electrochemical cell.

10. The electrical device of claim 9 wherein said metallic member is not attached to the electrical device within said container.

11. The electrical device as in claim 9 wherein said vent is designed to open at a pressure below about 400 p.s.i.g.

12. The electrical device as in claim 9 wherein said cell has a lithium anode.

13. The electrical device as in claim 12 wherein said cell has a thionyl chloride ($SOCl_2$) cathode depolarizer.

14. The electrical device of claim 13 wherein said venting pressure is between about 80 and 120 p.s.i.g.

* * * * *